(12) United States Patent
Cheng

(10) Patent No.: US 6,588,323 B1
(45) Date of Patent: Jul. 8, 2003

(54) SELF-LOCKING DEVICE FOR POSITIONING AN OPENED CONTAINER LID

(76) Inventor: Tian-Jyue Cheng, P.O. Box No. 6-57, Chung-Ho, Taipei 235 (TW)

( * ) Notice: Subject to any disclaimer, the term of this patent is extended or adjusted under 35 U.S.C. 154(b) by 53 days.

(21) Appl. No.: 10/163,462

(22) Filed: Jun. 7, 2002

(51) Int. Cl.[7] .............................. A23L 1/00; A47J 27/00; A47J 27/06; A47J 27/08; A47J 27/09
(52) U.S. Cl. .............................. 99/337; 99/340; 99/403; 220/316; 220/324; 220/912
(58) Field of Search ........................ 99/330, 337, 338, 99/403–410, 339, 340, 342; 126/369, 373.1, 384.1, 389.1; 219/401; 220/314–316, 324, 326, 573.1, 293, 912; 426/510, 511, 523

(56) References Cited

U.S. PATENT DOCUMENTS

| | | | | |
|---|---|---|---|---|
| 2,549,387 A | * | 4/1951 | Richeson | 220/316 |
| 4,024,982 A | * | 5/1977 | Schultz | 220/293 |
| 4,135,640 A | * | 1/1979 | MacQuilkin, et al. | 220/316 |
| 4,161,260 A | * | 7/1979 | Lagostina | 220/319 |
| 4,162,741 A | * | 7/1979 | Walker et al. | 220/203 |
| 4,574,988 A | * | 3/1986 | Karliner | 220/316 |
| 4,711,366 A | * | 12/1987 | Chen | 99/337 |
| 4,733,795 A | * | 3/1988 | Boehm | 220/316 |
| 4,796,776 A | * | 1/1989 | Dalquist et al. | 220/203 |
| 4,932,550 A | * | 6/1990 | Moucha | 99/403 |
| 5,048,400 A | * | 9/1991 | Ueda et al. | 99/403 |
| 5,370,257 A | * | 12/1994 | Chameroy et al. | 220/293 X |
| 5,678,721 A | * | 10/1997 | Cartigny et al. | 99/337 X |

* cited by examiner

Primary Examiner—Timothy F. Simone

(57) ABSTRACT

A self-locking device for positioning an opened container lid disposed at the jointing area of a container body and the container lid includes a transmission shaft, a positioning shaft, a heavy hammer and a rod thereof, an upper connecting piece and a lower connecting piece are respectively disposed on the lateral sides of the container lid and the container body; at one end of the positioning shaft, an arcuate concave slot matching with an arcuate opening port is disposed at a position corresponding to the arcuate opening port; when the container lid is opened, the arcuate opening port of the upper connecting piece and the arcuate concave slot on the positioning shaft overlap and lock each other to prevent the container from falling so as to facilitate the user's access to the object inside the container.

3 Claims, 4 Drawing Sheets

SELF-LOCKING DEVICE FOR POSITIONING AN OPENED CONTAINER LID

BACKGROUND OF THE INVENTION

1) Field of the Invention

The present invention relates to a cooking utensil, more especially to a self-locking device for positioning an opened container lid.

2) Description of the Prior Art

Along with the elevation of modem living standard, the application of cooking utensils becomes more particular. The household cooking wares for broiling, grilling, steaming, cooking and stewing are required to be not only durable and sturdy, but most of all, to be safe and convenient. Although various cooking wares available on the market have the cooking functionality, they still have certain shortcomings, especially in the structure of the container lids of the containers used for steaming, cooking and stewing. Among them, one kind of the most popular cooking wares usually has a separate lid. However, it is not only space-consuming, but also inconvenient for use. The other kind has a container lid connected on the lateral side of a cooking ware and capable of freely rotating along a rotary rod. However, this kind of cooking ware is unable to position an opened container lid by self-locking at a certain position. It is necessary to apply an external force to support the opened container lid while the user tries to take food out of the container. This kind of container lid is generally not very convenient for use and is unsafe, especially for children and young kids.

In view of the abovementioned shortcomings, the inventor of the present invention researched and designed a self-locking device for positioning an opened container lid with more practical and applicable scope as well as for more industrially utilizing value.

SUMMARY OF THE INVENTION

The present invention of a self-locking device for positioning an opened container lid disposed at the jointing area of a container body and the container lid comprises a transmission shaft, a positioning shaft, a heavy hammer and a rod thereof, an upper connecting piece and a lower connecting piece, wherein the upper and the lower connecting pieces are respectively disposed on the lateral sides of the container lid and the container body; the positioning shaft is horizontally erected on two convex pieces disposed at two ends of the lower connecting piece; one end of the positioning shaft is disposed with the heavy hammer and the rod thereof for rotating clockwise or anticlockwise; the transmission shaft is horizontally erected at the overlapping area of a convex piece of the upper connecting piece and the convex piece of the lower connecting piece; an arcuate opening port is disposed on the sides of the convex pieces at two ends of the upper connecting pieces; at one end of the positioning shaft, an arcuate concave slot matching with the arcuate opening port is disposed at a position corresponding to the arcuate opening port; when the container lid is closed, the heavy hammer and the rod thereof rotates upwardly; at this time, the arcuate opening port and the arcuate concave slot separate from each other; when the container lid is opened, the heave hammer and the rod thereof rotate downwardly; at this time, the arcuate opening port of the upper connecting piece and the arcuate concave slot on the positioning shaft overlap and lock each other to achieve the objective of locking and positioning the opened container lid.

Through the abovementioned mechanism and operation, the effect of the present invention is to allow the container lid to open freely and self-lock at a certain degree to prevent the container lid from falling as well as to be safe and convenient for the user to access to the object inside the container.

The primary objective of the present invention is to provide an opened container lid capable of self-locking for positioning at a certain position to prevent the container lid from freely falling to close so as to convenience the user in accessing the object inside the container.

To enable a further understanding of the objective, structural features and function of the present invention, the brief description of the drawings below is followed by the detailed description of the preferred embodiment.

DETAILED DESCRIPTION OF THE PREFERRED EMBODIMENTS

Figure 1:
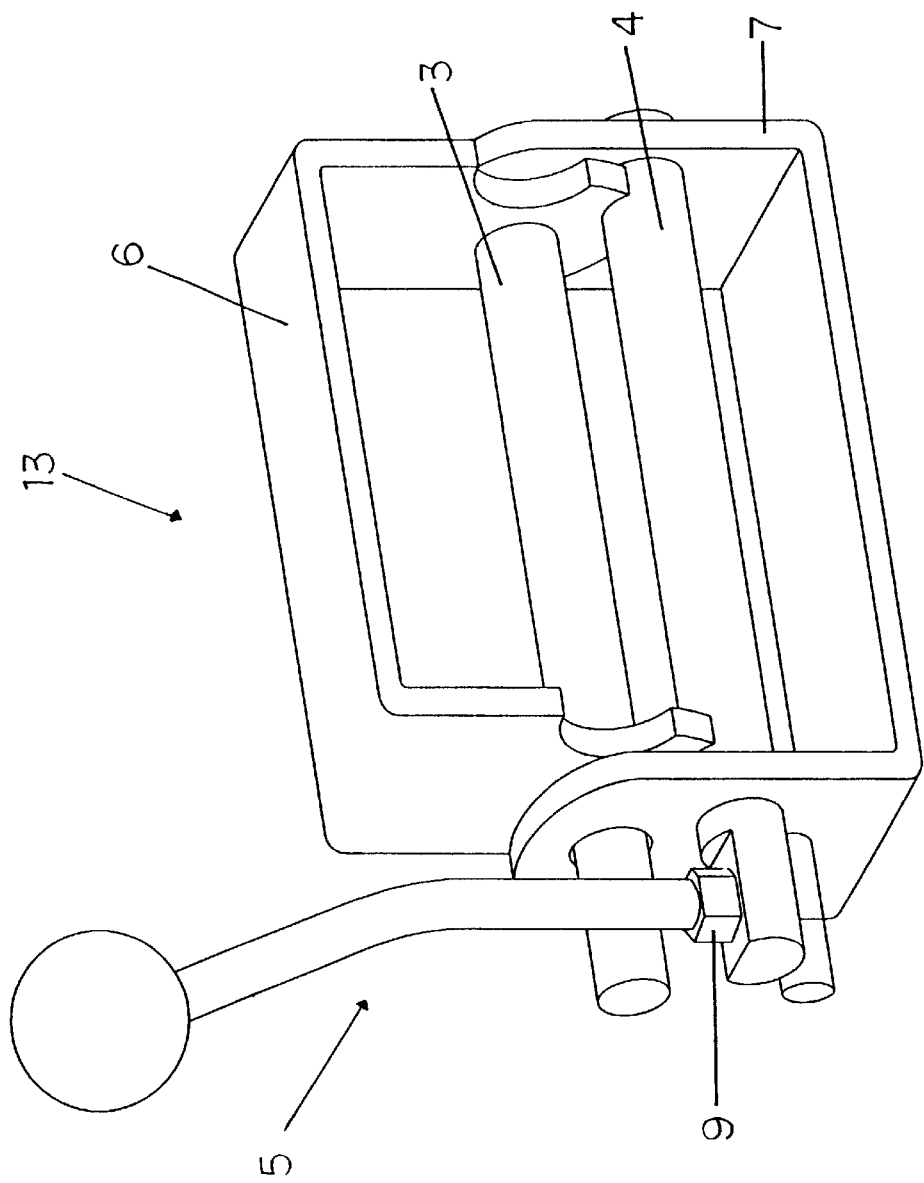
FIG. 1 is a structural and schematic drawing of an exemplary embodiment of the present invention.
Figure 2:
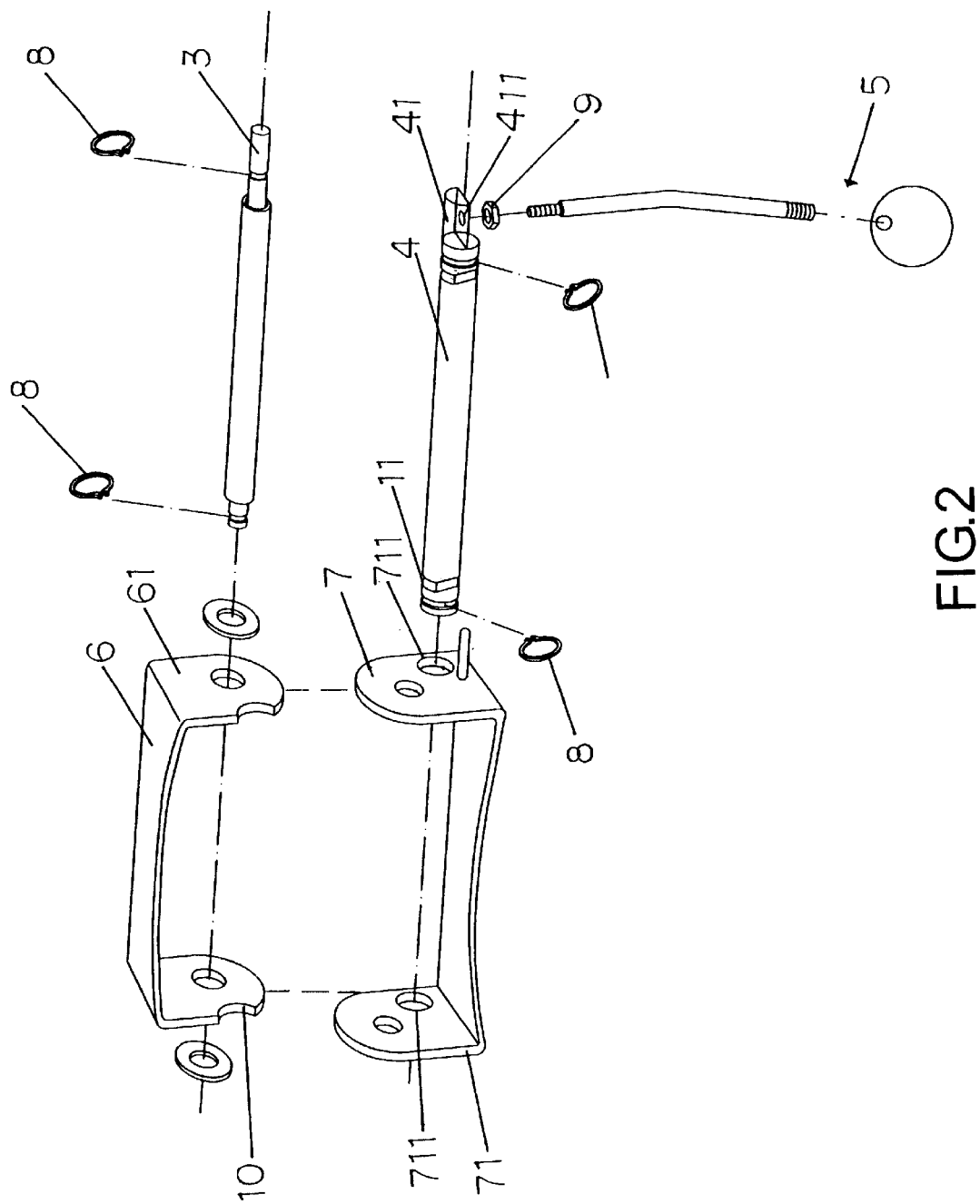
FIG. 2 is a schematic drawing of the assembling a self-locking device for positioning an opened container lid.
Figure 3:
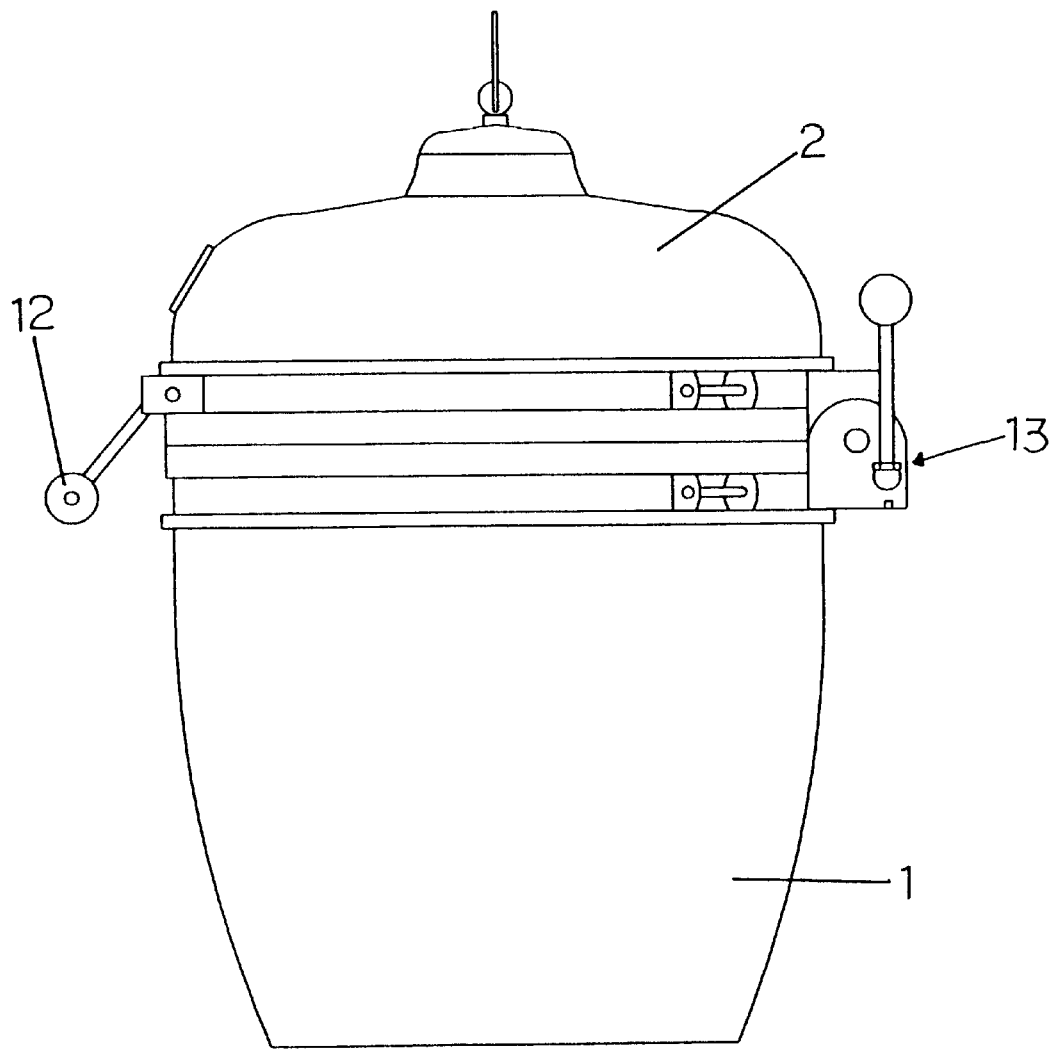
FIG. 3 is a drawing of the status of the positioning and self-locking device when the container lid is closed.
Figure 4:
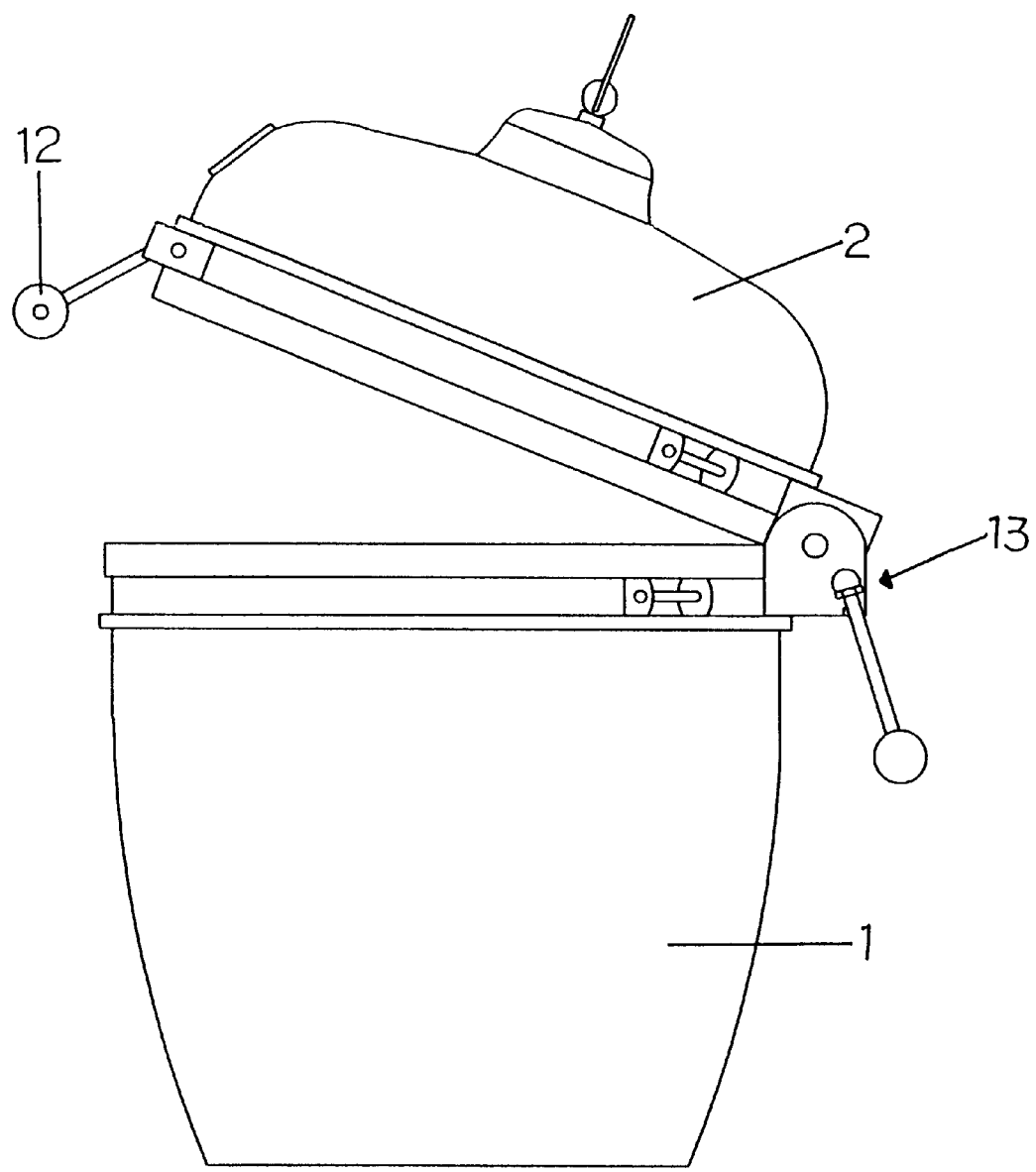
FIG. 4 is a drawing of the status of the positioning and self-locking device when the container lid is opened.

As indicated in the Figures, a self-locking device (13) for positioning an opened container lid disposed at the jointing area of a container body (1) and the container lid (2) comprises the container body (1), the container lid (2), a transmission shaft (3), a positioning shaft (4), a heavy hammer and a rod thereof (5), an upper connecting piece (6), a lower connecting piece (7), an opening spring clip ring (8) and a nut (9), wherein the configurations of the upper and lower connecting pieces (6, 7) are in U-shapes; the opening area of the upper connecting piece (6) faces downwardly to pass through a ring clip (14) or to be fixed onto the lateral side of the container body (1) directly; the opening area of the lower connecting piece (7) faces upwardly allowing the upper connecting piece (6) to insert into the opening thereof and passes through the ring clip (14) or to be fixed onto the lateral side of the container body (1) directly. Two convex pieces (71) on the two sides of the lower connecting pieces (7) are disposed with concave holes (711) for erecting the positioning shaft (4); one end of the positioning shaft (4) forms a flat bar (41) disposed with a concave slot (411) for inserting the heavy hammer and the rod thereof (5) which is capable of driving the positioning shaft (4) to rotate clockwise or anticlockwise at 180 degrees and is locked by a nut (9). The transmission shaft (3) is horizontally erected at the overlapping area of a convex piece (61) of the upper connecting piece (6) and the convex piece (71) of the lower connecting piece (7); an arcuate opening port (10) is disposed on the sides of the convex pieces (61) at two ends of the upper connecting pieces (6); at one end of the positioning shaft (4), an arcuate concave slot (11) matching with the arcuate opening port (10) is disposed at a position corresponding to the arcuate opening port (10); the opening clip rings (8) firmly lock the connecting area of the upper connecting piece (6), the lower connecting pieces (7) as well as the transmission shaft (3) and the positioning shaft (4).

Furthermore, a lifting handlebar (12) is disposed on the lateral side of the container lid (2) for opening the container lid (2) at an opening degree less than 90°.

In summation of the abovementioned, through said mechanism, when the container lid is closed, the heavy hammer and the rod thereof rotates clockwise and upwardly, the arcuate opening port and the arcuate concave slot separate to unlock the container lid; when the container lid is opened, the upper connecting piece rotates on the transmission shaft along with the container lid, the heavy hammer and the rod thereof rotate downwardly and anticlockwise to make the connected positioning shaft rotate together; at this time, the arcuate opening port of the upper connecting piece and the arcuate concave slot on the positioning shaft overlap and lock each other to achieve the objective of opening, positioning and locking the container lid.

It is of course to be understood that the embodiment described herein is merely illustrative of the principles of the invention and that a wide variety of modifications thereto may be effected by persons skilled in the art without departing from the spirit and scope of the invention as set forth in the following claims.

I claim:

1. A self-locking device for positioning an opened container lid disposed at the jointing area of a container body and the container lid comprises a transmission shaft, a positioning shaft, a heavy hammer and a rod thereof, an upper connecting piece and a lower connecting piece; wherein the upper and the lower connecting pieces are respectively disposed on the lateral sides of the container lid and the container body; the positioning shaft is horizontally erected on two convex pieces disposed at two ends of the lower connecting piece; one end of the positioning shaft is disposed with the heavy hammer and the rod thereof for rotating clockwise or anticlockwise; the transmission shaft is horizontally erected at an overlapping area of a convex piece of the upper connecting piece and the convex piece of the lower connecting piece; an arcuate opening port is disposed on the sides of the convex pieces at two ends of the upper connecting pieces; at one end of the positioning shaft, an arcuate concave slot matching with the arcuate opening port is disposed at a position corresponding to the arcuate opening port; when the container lid is closed, the heavy hammer and the rod thereof rotates clockwise and upwardly, the arcuate opening port and the arcuate concave slot separate to unlock the container lid; when the container lid is opened, the upper connecting piece rotates on the transmission shaft along with the container lid, the heavy hammer and the rod thereof rotate downwardly and anticlockwise to make the connected positioning shaft rotate together; at this time, the arcuate opening port of the upper connecting piece and the arcuate concave slot on the positioning shaft overlap and lock each other to achieve the objective of opening, positioning and locking the container lid.

2. The present invention of a self-locking device for positioning an opened container lid according to claim 1, wherein the opening degree of the container lid is less than 90°.

3. The present invention of a self-locking device for positioning an opened container lid according to claim 1, wherein a lifting handlebar is disposed on a lateral side of the container lid for opening the container lid.

* * * * *